Patented Sept. 29, 1953

2,653,881

UNITED STATES PATENT OFFICE 2,653,881

HEAT-ACTIVATABLE SUSTAINED-TACK ADHESIVE TAPE

Robert E. Vetter, Western Springs, Ill., assignor to Mid-States Gummed Paper Company, Chicago, Ill., a corporation of Delaware No Drawing. Application December 28, 1950, Serial No. 203,236

2 Claims. (Cl. 117—122)

This invention relates to adhesive sheet material or tape having an adhesive coating that is normally non-tacky but which upon heating, becomes tacky, retains the tack for a sustained period, and then again becomes non-tacky.

The present invention provides an improvement on the tape broadly described and claimed in the copending application of Hendricks and Schmelzle Serial No. 115,958, filed Sept. 15, 1949.

The said Hendricks et al. construction has many uses and many highly desirable properties, including the capacity of being stacked or rolled on itself at normal room temperatures without blocking, and the capacity of adhering to glass.

However, the known tapes of this type, including the said Hendricks et al. tape, lack certain of the capacities that are necessary to render them commercially feasible for certain desired uses.

An example of such a use is the formation of individually cut out labels for glass bottles by the die-cutting of stacks of the adhesive coated tape or sheet material. Heretofore blocking has occurred in such die-cutting operations. Also, in applying the labels to glass, too much of the capacity to adhere to glass has been lost whenever the application of the heat-activated label is delayed, thus precluding the use of labeling procedures that call for an appreciable time interval between the heating of the label and its application to the bottle.

Attempts to remedy this have heretofore been unsuccessful. For example, improvement of the adhesion, as by the addition of a resin, has increased the tendency to block.

Accordingly, objectives of the present invention include the provision of a heat-activated sustained-tack adhesive tape or sheet that will not block when stacks thereof are die-cut and that will also adhere adequately to glass even though there is an appreciable time interval between the heating and the application to the glass.

The invention provides for the modification of the polyamide ester resin described in the said Hendricks and Schmelzle application by the addition thereto of zero acid number hydrocarbon terpene resin having a high melting point, of the order of 115° C.

The following data illustrate suitable adhesive formulations.

Formula 1

| | Parts by weight |
|---|---|
| Monoethanolamine | 70–100 |
| Ethylene diamine | 30– 0 |
| Sebacic acid | 95– 50 |
| Dimerized fatty oil acids | 5– 50 |

Formula 2

| | Parts by weight |
|---|---|
| Sebacic acid | 169 |
| 85% dilinoleic acid of 180 to 192 acid number | 174 |
| Monoethanolamine | 68 |
| Zinc chloride | .4 |
| Hydroquinone | 2 |

Formula 3

| | Parts by weight |
|---|---|
| Formula 2 resin | 248 |
| 115° C. melting point, zero acid number hydrocarbon terpene resin | 106 |
| Monoethyl ether of ethylene glycol (solvent) | 36 |
| Xylol (solvent) | 230 |

Formula 1 is the general formula for the polyamide ester resin, in which the quantities of the components are shown in terms of their molar equivalents, the proportional molar equivalents of the amines and of the acids each totalling substantially 100. The proportional molar equivalents of the ethylene diamine preferably are not greater than about six-tenths the proportional molar equivalents of the dimerized fatty oil acids. Where the amount of ethylene diamine is zero, the proportional molar equivalents of the dimerized fatty oil acids is preferably not greater than about 40.

According to the present invention, zero acid number hydrocarbon terpene resin having a high melting point, of the order of 115° C., and at least about an equal amount of the resin of Formula 1, are mixed, and the mixture then coated onto a backing of sheet material to form heat-activatable sustained-tack adhesive tape or sheets.

Formula 2 is a preferred formula for a specific polyamide ester resin. In preparing this resin, use a kettle equipped with an agitator. Charge the sebacic acid, the dilinoleic acid, the amine and the zinc chloride to the kettle in that order. Agitate and heat to 300° F. Purge the kettle thoroughly with inert gas, using the gas at the rate of two cubic feet per minute. Use the xylol for azeotropic removal of the water formed. Hold at 300° F. for one hour. Heat to 400° F. Hold at 400° F. until the viscosity reaches 4000 centipoise at 150° C. (by a Brookfield viscosimeter with spindle No. 2 at 6 R. P. M.). Add the hydroquinone. Mix for five minutes. Drain.

Formula 3 is a preferred formula for the adhesive. Use a kettle equipped with an agitator. Charge the solvents to the kettle. Agitate and heat while charging the terpene resin. Heat to 190° F. After 30 minutes of mixing, add the Formula 2 resin. Allow to mix at 190° F. until thoroughly dissolved. Drain.

A commercially available 115° C. melting point, zero acid number hydrocarbon terpene resin is that sold under the trade name "Piccolyte S-115." The proportions of the formula 2 resin and the terpene resin may range from 70:30 to 65:35.

The dimerized fatty acids may be prepared by polymerization of the fatty acids of drying or semi-drying oils, e. g., linseed, soybean or cottonseed oil, by any of a number of well-known methods. The quantity used varies inversely according to the acid number.

Adhesive sheets made in accordance with the present invention have important advantages and capacities for performance in the field of labelling glass bottles that are not possessed by prior tapes of this type.

For example, tests have shown that tape made with the Formula 2 resin as the adhesive coating, blocked at 110° F., whereas tape made according to the present invention (with the Formula 3 composition as the adhesive) does not block until a temperature of 125° F. has been reached. In making these tests, the temperature was maintained for one hour and the stack of sheets was subjected during that time to a pressure of 10 pounds per square inch.

In testing for adhesion to glass, paper labels were employed, and the adhesion rating system used was "excellent," "good," "fair" and "poor." "Excellent" means that a complete label split occurred when an attempt was made to remove the label with a 90° pull; "good" means a partial label split; "fair" means no label split but a fair bond; and "poor" means no bond at all. The tests were made on a strip approximately ¼" x 2½" in which a small tab was left unadhered for testing purposes. The strips were activated at about 325° F. and then applied after a few seconds cooling period.

Formula 2 labels and Formula 3 labels both rated "excellent" in the case of instant application to glass (simultaneous application and heating), but when the application was delayed for a few seconds after heating, the Formula 2 labels rated only "fair" whereas the Formula 3 labels continued to rate "excellent."

Numerous resins other than hydrocarbon terpene resin have been tried as the additive to Formula 2 (such as phenolic, alkyd, chlorinated diphenyl, coumarone-indene and rosin derivative resins) but thus far none have produced compositions having the twofold desideratum of the adhesive of the present invention.

I claim:

1. A heat-activatable sustained-tack adhesive sheet comprising a backing coated with a composition comprising zero acid number hydrocarbon terpene resin having a melting point of the order of 115° C. and at least about an equal amount of the heat reaction product of the following components in the indicated proportional molar equivalents:

| | |
|---|---|
| Monoethanolamine | 70–100 |
| Ethylene diamine | 30– 0 |
| Sebacic acid | 95– 50 |
| Dimerized fatty oil acids | 5– 50 | wherein the proportional molar equivalents of the amines and of the acids each total substantially 100; the proportional molar equivalents of the ethylene diamine being not greater than about six-tenths the proportional molar equivalents of the dimerized fatty oil acids; and, where the amount of ethylene diamine is zero, the proportional molar equivalents of the dimerized fatty oil acids being not greater than about 40.

2. A heat-activatable sustained-tack adhesive sheet comprising a backing coated with a composition comprising 106 parts by weight of zero acid number hydrocarbon terpene resin having a melting point of the order of 115° C. and 248 parts by weight of the heat reaction product of the following components:

| | Parts by weight |
|---|---|
| Sebacic acid | 169 |
| 85% dilinoleic acid of 180 to 192 acid number | 174 |
| Monoethanolamine | 68 |
| Zinc chloride | .4 |
| Hydroquinone | 2 |

ROBERT E. VETTER.

References Cited in the file of this patent

UNITED STATES PATENTS

| Number | Name | Date |
|---|---|---|
| 2,469,108 | Fries | May 3, 1949 |
| 2,484,416 | Martin | Oct. 11, 1949 |
| 2,495,008 | Keaton | Jan. 17, 1950 |